United States Patent [19]
Johnson

[11] Patent Number: 5,564,738
[45] Date of Patent: Oct. 15, 1996

[54] OVERFLOW CHANNELING REACTION CANISTER ASSEMBLY

[75] Inventor: Darrin L. Johnson, Uintah, Utah

[73] Assignee: Morton International, Inc., Chicago, Ill.

[21] Appl. No.: 512,591

[22] Filed: Aug. 10, 1995

[51] Int. Cl.[6] ................................................ B60R 21/26
[52] U.S. Cl. ........................ 280/736; 280/732; 280/741
[58] Field of Search ............................ 280/728.2, 739, 280/738, 740, 736, 741, 732, 737, 742; 102/530, 531; 422/164, 165, 166, 167

[56] References Cited

U.S. PATENT DOCUMENTS

| | | | |
|---|---|---|---|
| 3,938,826 | 2/1976 | Giorgini et al. | 280/738 |
| 4,296,084 | 10/1981 | Adams et al. | 422/166 |
| 4,380,346 | 4/1983 | Davis et al. | 280/736 |
| 4,394,033 | 7/1983 | Goetz et al. | 280/736 |
| 4,817,828 | 4/1989 | Goetz | 222/3 |
| 4,950,458 | 8/1990 | Cunningham | 422/164 |
| 5,221,109 | 6/1993 | Marchant | 280/736 |
| 5,226,670 | 7/1993 | Wright et al. | 280/738 |
| 5,332,256 | 7/1994 | Lauritzen et al. | 280/728.2 |
| 5,342,082 | 8/1994 | Kriska et al. | 280/728.2 |
| 5,346,248 | 9/1994 | Rhein et al. | 280/732 |
| 5,360,232 | 11/1994 | Lowe et al. | 280/741 |
| 5,407,223 | 4/1995 | Lauritzen et al. | 280/728.2 |
| 5,407,226 | 4/1995 | Lauritzen et al. | 280/739 |
| 5,433,475 | 7/1995 | Kokeguchi | 280/738 |

FOREIGN PATENT DOCUMENTS 2251221   7/1992   United Kingdom .................. 280/736

Primary Examiner—Brian L. Johnson
Assistant Examiner—Peter C. English
Attorney, Agent, or Firm—Corinne R. Gorski; Gerald K. White

[57] ABSTRACT

A reaction canister assembly for use in an inflatable airbag module system comprises a reaction canister housing having at least one open side and an inflator chamber. An inflator is disposed in the inflator chamber and includes a plurality of perforations or ports for passing excess gas generated within the inflator into the canister housing. At least one endplate partially closes the open side of the canister to leave an excess gas outlet passage at the open side of the housing. At least one overflow channel extends along a length of the housing for filtering and cooling the excess gas generated by the inflator. The excess gas passes through the ports of the inflator into the overflow channels and is discharged through the excess gas outlet passage at the open side of the housing.

9 Claims, 4 Drawing Sheets

OVERFLOW CHANNELING REACTION CANISTER ASSEMBLY

BACKGROUND OF THE INVENTION

1. Field of the Invention

The present invention relates to an overflow channeling reaction canister assembly for an air bag module, and more particularly to a reaction canister assembly which vents filtered and cooled excess gas from open ends of the reaction canister assembly.

2. Description of the Related Art

A typical inflator produces excess gas, thus requiring a module design capable of withstanding pressures resulting from maximum expected gas output. Designs which vent hot gas directly out the back of the inflator subject contents within the instrument panel to direct impingement of high temperature, high velocity jets of gas and or flame from the inflator. Such a design is disclosed in U.S. Pat. No. 4,817,828 to Goetz, wherein excess gas is vented through aligned openings in the inflator assembly and reaction canister and directly into the dashboard of the vehicle.

Another disadvantage of this design is that precise alignment of the inflator ports and the ports in the reaction canister is necessary, thus significantly increasing assembly time and costs.

SUMMARY OF THE INVENTION

It is an object of the present to provide a reaction canister assembly which allows the module to be designed for lower maximum operating pressures, which results in improved occupant protection at higher temperatures, as well as a more reliable module performance due to reduced and more consistent pressure loading of the module over the design temperature range.

The present invention overcomes the deficiencies of the prior art by providing a reaction canister assembly for use in an inflatable airbag module system which comprises a reaction canister housing having at least one open side and an inflator chamber. An inflator is disposed in the inflator chamber and includes means for passing excess gases generated within the inflator into the canister housing. At least one endplate partially closes the open side of the canister to leave an excess gas outlet passage at the open side of the housing. Means disposed in the canister housing filter and cool the excess generated gas. The excess gases generated by the inflator pass through the passing means into the filtering and cooling means and are discharged through the excess gas outlet passage at each side of the housing.

The filtering and cooling means comprise at least one overflow channel extending along a length of the housing. The overflow channel provides flexibility to design and controls the flow of excess gas away from critical components within the instrument panel.

The reaction canister assembly of the present invention offers an improvement over existing vented can designs by cooling and filtering the excess gas prior to release into the instrument panel. The excess gas is cooled and filtered by impingement and heat exchange within the overflow channel.

The reaction canister assembly of the present invention simplifies venting of the excess gas by providing the overflow channel to direct the excess gas without the requirement of secondary operations such as punching holes in the back of the can and aligning the holes with the inflator.

Other features and advantages of the present invention will become apparent from the following description of the invention which refers to the accompanying drawings.

DETAILED DESCRIPTION OF THE PREFERRED EMBODIMENTS

The reaction canister assembly 10 of the present invention is designed for use with an air bag module restraint system mounted in an appropriate manner in the dash board of a vehicle, shown in phantom as 12.

Figure 1:
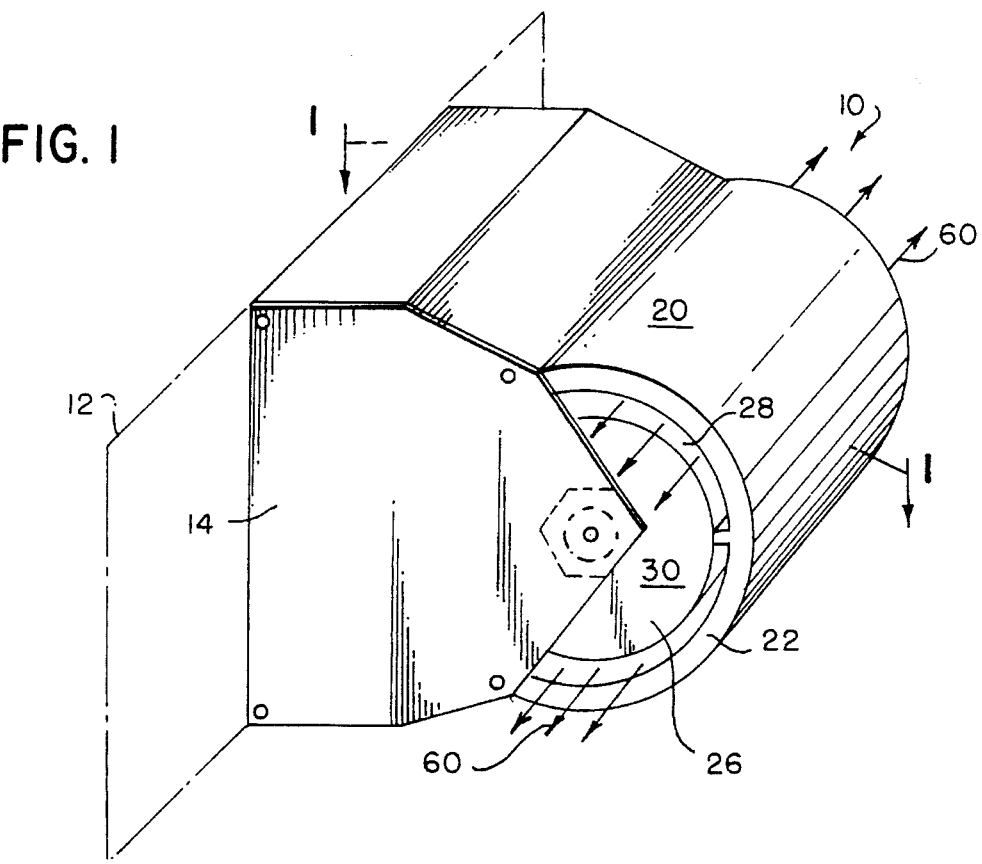
FIG. 1 is a perspective view of the assembled reaction canister assembly of the present invention.
Figure 2:
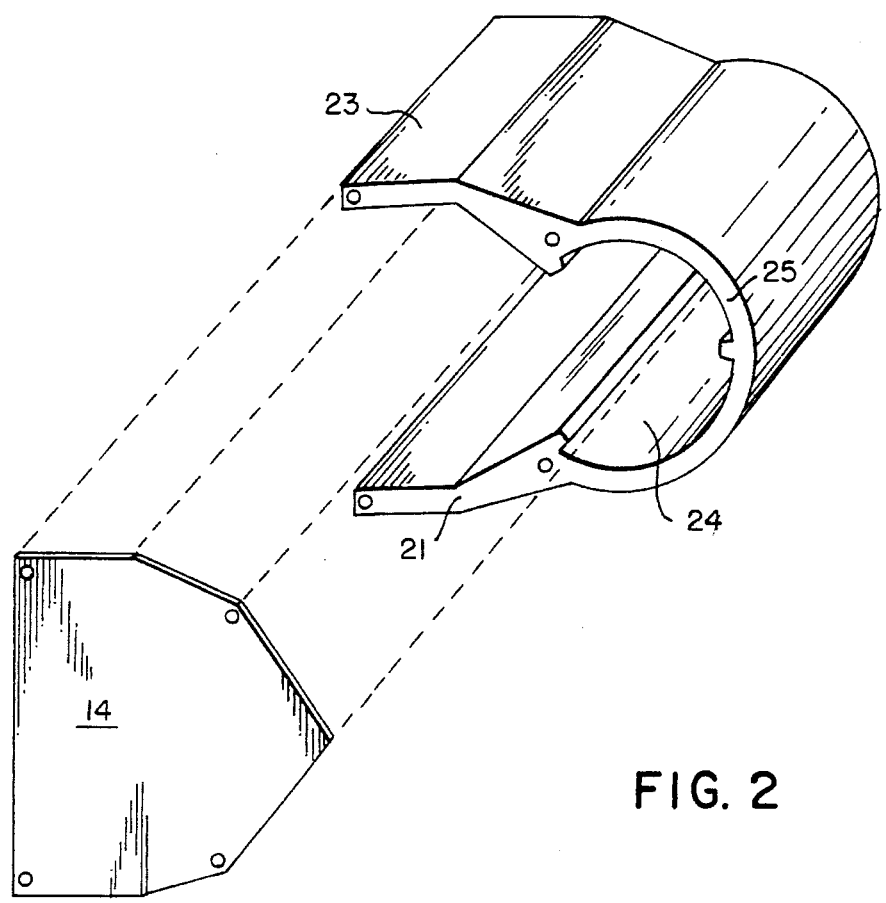
FIG. 2 is a perspective view of the reaction canister housing and end plate of the present invention.
Figure 3:
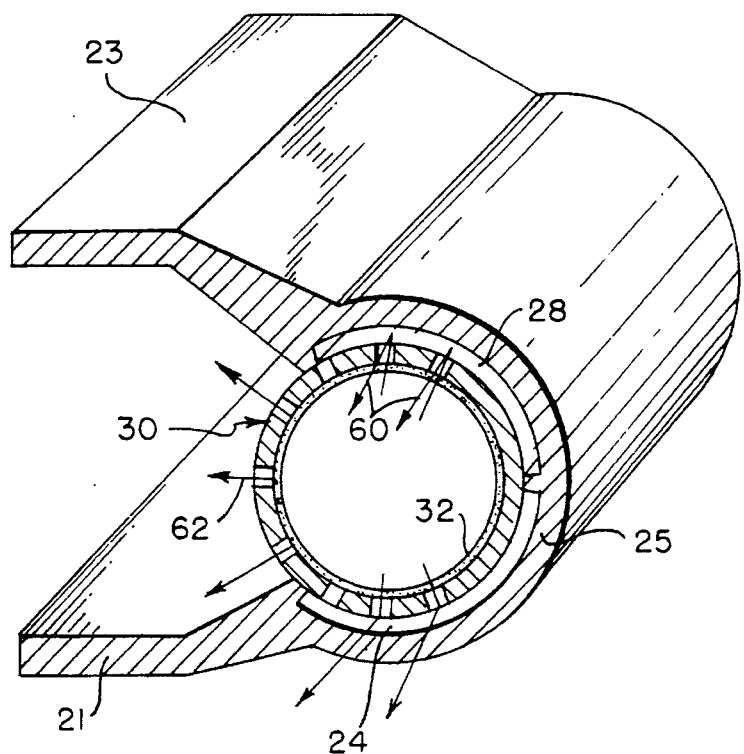
FIG. 3 is a cross-sectional view of the reaction canister assembly of the present invention taken along line I—I of FIG. 1.

As shown in the drawing figures, the assembly 10 comprises a reaction can or canister housing 20 having at least one open end 22. Referring to FIG. 1, one end plate 14 is shown partially closing open end 22 of housing 20. It should be appreciated that both ends of the housing can be open, or one end open and the other end closed. If both ends of the housing 20 are open, a second end plate (not shown) partially or completely closes the other end of housing 20. An inflator 30 is disposed within an inflator chamber 24 of housing 20, see FIGS. 1 and 3.

Reaction can housing 20 can be extruded in a single trough-shaped piece, of a material such as aluminum. The can includes side walls 21, 23 joined by a curved bottom wall 25. Bottom wall 25 also forms the inflator chamber 24 for housing the inflator 30. Curved bottom wall 25 includes overflow channels 28 extending along the entire length of the housing. Channels 28, which will be described further herein, can be formed during the extrusion of the housing, thus preventing the need for secondary manufacturing operations. Excess gas generated during the expansion of the air bag is exhausted from the open ends of the assembly, as shown by arrows 60 in FIG. 1.

As shown in FIG. 1, end plate 14 is attached to the open end 22 of the reaction can housing 20 by known fastening means. When assembled, end plate 14 only partially covers the housing end, leaving a gas outlet passage 26 for permitting excess gas from the inflator to flow outwardly from the side of the assembly, which will be described further herein.

The inflator 30 includes an elongated perforated tubular housing 32. As is known in the art, the inflator housing encloses a solid gas generant composition (not shown) which generates gas for inflating an air bag (not shown).

Figure 4:
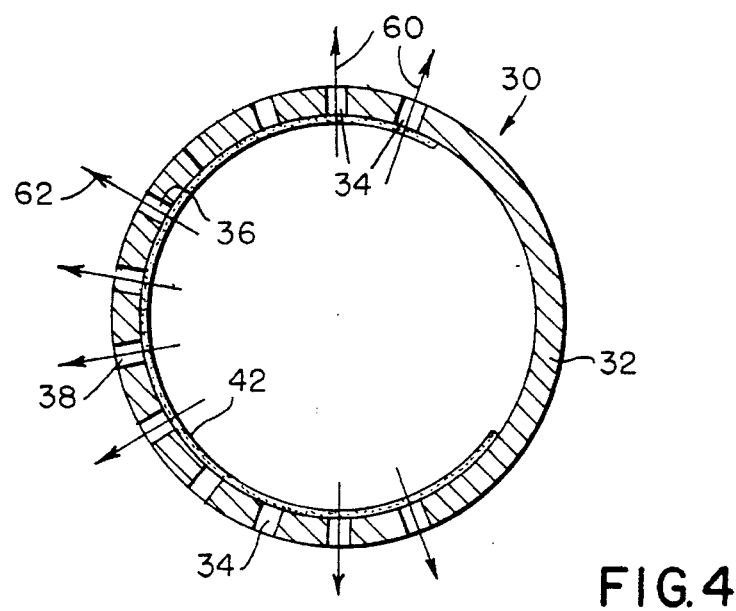
FIG. 4 is an enlarged cross-section of the inflator housing of the present invention.

Referring to FIG. 4, the inflator housing 32 includes a plurality of perforations or ports for discharging gas. In this embodiment, a plurality of different sized ports 34, 36, and 38 are shown. The ports 34, 36 and 38 range in diameter between, for example, 90/1000 to 130/1000. mm.

The ports are sealed with a thin layer of aluminum foil 42, which can have a thickness ranging from, for example 0.004 to 0.006 inch. Foil 42 ensures that the gas pressure will reach a certain threshold value before being discharged into the air bag. The different sized ports 34, 36 and 38 each have different burst pressures to ensure adequate inflation of the air bag for different operating conditions. For example, the foil coveting the smaller dimensioned ports 34, disposed in vicinity of the overflow channels, will burst at a higher pressure, for example 2000 psi. The foil over the larger ports 38 will burst at, for example, 750 psi.

Figure 5:
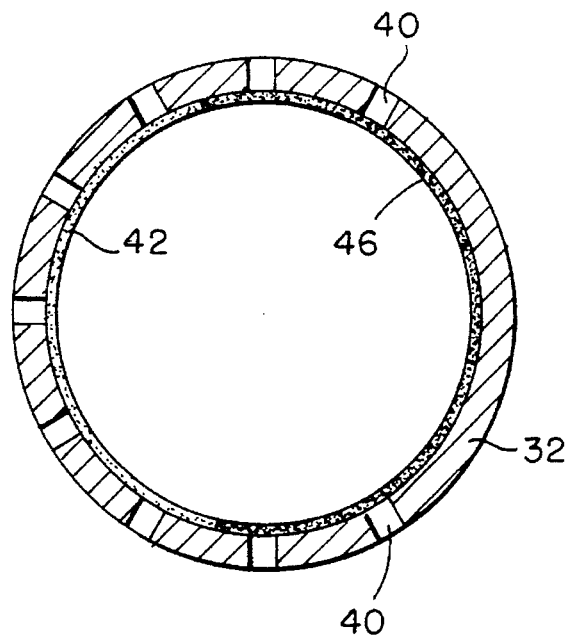
FIG. 5 is a cross-section of another inflator housing according to the present invention.
Figure 6:
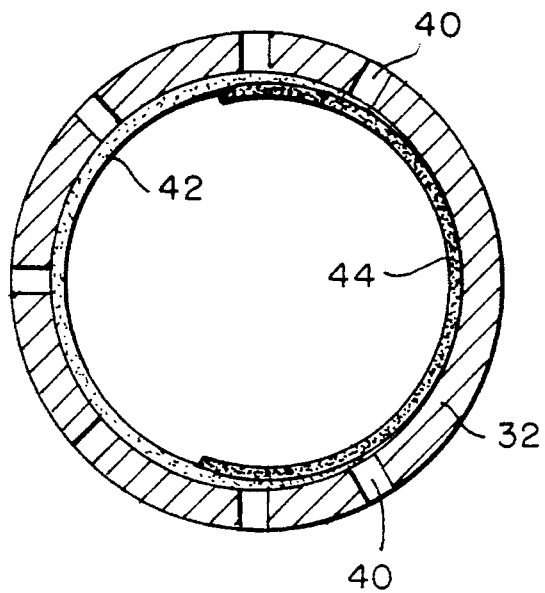
FIG. 6 is a cross-section of a third embodiment of the inflator housing of the present invention.

In the embodiments of FIGS. 5 and 6, the ports are of a single size. However, as shown in FIG. 5, some ports 40 are covered by a second layer of foil 46 which will break out at a different operating pressure than the ports covered only by foil layer 42. In FIG. 6, some of the ports 40 are covered by both foil layer 42 and a second foil layer 44.

Both of the foil layers 42, 44 can be positioned within the inflator in a variety of ways. For example, the foil layers can be multiple strips or disks of various thicknesses.

In summary, the present invention contemplates at least three methods for creating ports which open at various different temperatures: 1) a single layer of foil and a plurality of ports having different size diameters, as discussed with reference to FIG. 4; 2) a plurality of ports having the same size diameter with multiple foil layers, as discussed with reference to FIG. 5; or 3) a plurality of ports having the same size diameter and multiple foil layers over only some of the ports, as discussed with reference to FIG. 6. In the latter case, the higher pressure burst ports are preferably located in the overflow channel area, and can be covered by an overlapping strip of foil to provide a double foil layer over the ports located in the overflow channels.

Referring back to FIGS. 3 and 4, when the inflator generates gas, some of the gas will pass forwardly into the air bag, as shown by arrows 62 to inflate an airbag (not shown). However, the excess gas generated is exhausted into the overflow channels 28, as shown by arrows 60.

As discussed above, overflow channels 28 provide means for cooling and filtering the excess gas. As the excess gas 60 passes through the ports into channels 28 the gas impinges on the wall 25 of the reaction canister housing 20 and changes direction. The solid particles of the gas separate and stick to the wall of the channels, thus filtering the gas.

Figure 7:
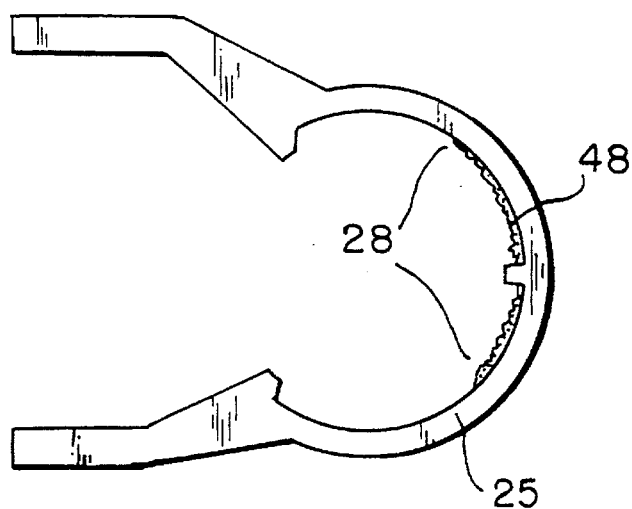
FIG. 7 is a cross-sectional view of another embodiment of the reaction canister housing of the present invention.
Figure 8:
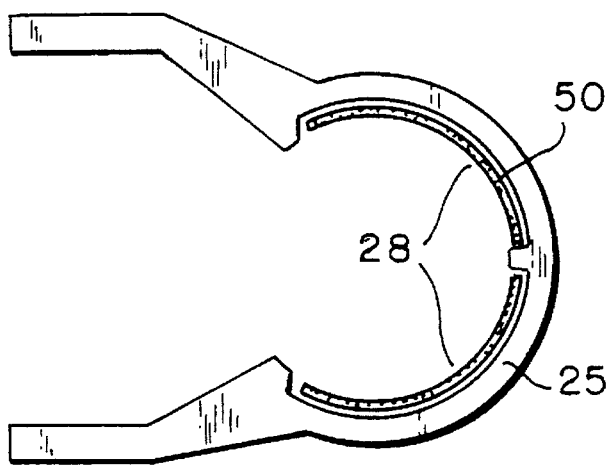
FIG. 8 is a cross-sectional view of still another embodiment of the reaction canister housing of the present invention.

Cooling of the gas is accomplished by traditional convective heat transfer as it travels along the length of the channels to pass from gas outlet passages 26. Additional cooling and filtering of the gas may be provided by adding surface roughness 48 to the inside walls of the channels, as shown in FIG. 7. As shown in FIG. 8, materials, for example, a screen insert 50, can also be added to the inside walls of the channels to trap the solid particles and add surface area for convective cooling.

Given the above, the excess gas will not be vented directly out the back of the module assembly, as disclosed by the prior art, but can be vented from the sides of the module at reduced temperature, pressure and velocity. The features of the present invention allow a more economical module design and simultaneously protects contents of the vehicle's instrument panel from high pressure, high temperature gas jets.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A reaction canister assembly for use in an inflatable airbag module system, comprising:

a reaction canister housing having at least one open end and an inflator chamber;

an inflator disposed in said inflator chamber, said inflator including means for passing excess gases generated within the inflator into said canister housing;

at least one endplate partially closing the at least one open end of said canister housing to leave at least one excess gas outlet passage at the at least one open end of the canister housing for venting the excess gases from the at least one open end of the canister housing; and means disposed in said canister housing for filtering and cooling the excess generated gates, the filtering and cooling means comprising at least one channel formed by and extending along a length of the canister housing, wherein the excess gases generated by the inflator pass through the passing means into said at least one channel and is discharged through the at least one excess gas outlet passage at the at least one open end of the canister housing.

2. The reaction canister assembly of claim 1, wherein said means for passing excess gases generated comprises a plurality of ports disposed in a housing of the inflator.

3. The reaction canister assembly of claim 2, further comprising a first layer of gas rupturable foil covering at least some of said ports.

4. The reaction canister assembly of claim 3, wherein the plurality of ports range in diameter from 0.09 mm to 0.13 mm.

5. The reaction canister assembly of claim 3, wherein each of the plurality of ports has an equal diameter.

6. The reaction canister assembly of claim 5, wherein at least some of the plurality of ports are covered by a second layer of gas rupturable foil.

7. The reaction canister assembly of claim 1, wherein an inner surface of the at least one channel includes a surface roughness to improve the filtering and cooling of the excess generated gases.

8. The reaction canister assembly of claim 1, further comprising a screen disposed along an inner surface of the at least one channel to improve the filtering and cooling of the excess generated gases.

9. A method of venting filtered and cooled excess gas generated from an inflatable airbag module system, comprising the steps of:

generating excess gas from an inflator of a reaction canister assembly of the inflatable airbag module system, the reaction canister assembly including a reaction canister housing having at least one open end, at least one endplate partially closing the at least one open end of the canister housing and an inflator chamber for receiving the inflator;

passing the excess generated gas from means disposed in the inflator into filtering and cooling means of the reaction canister housing, the filtering and cooling means comprising at least one channel formed by and extending along a length of the canister housing;

filtering and cooling the excess generated gas in the at least one channel; and venting the filtered and cooled excess generated gas from the at least one open end of the reaction canister housing.

\* \* \* \* \*